United States Patent [19]

Jansen

[11] 4,443,721
[45] Apr. 17, 1984

[54] ELECTRODYNAMIC DEVICE FOR TRANSLATING AN OBJECTIVE

[75] Inventor: Gerardus L. M. Jansen, Eindhoven, Netherlands

[73] Assignee: U.S. Philips Corporation, New York, N.Y.

[21] Appl. No.: 471,972

[22] Filed: Mar. 4, 1983

[30] Foreign Application Priority Data

Dec. 24, 1982 [NL] Netherlands .................. 8204981

[51] Int. Cl.³ ........................................... H02K 41/00
[52] U.S. Cl. ........................................ 310/14; 310/17
[58] Field of Search ................... 310/12, 14, 15, 17, 310/34, 80, 152, 154, 191

[56] References Cited

U.S. PATENT DOCUMENTS

| | | | |
|---|---|---|---|
| 3,495,147 | 2/1970 | Flora | 310/14 X |
| 3,525,887 | 8/1970 | D'Ewart, Jr. | 310/17 |
| 3,984,706 | 10/1976 | Inouye | 310/12 |
| 4,023,056 | 5/1977 | Yamada et al. | 310/15 |
| 4,259,602 | 3/1981 | Kuribayashi et al. | 310/12 |
| 4,260,914 | 4/1981 | Hertrich | 310/15 X |
| 4,377,761 | 3/1983 | Staciokas | 310/14 X |

*Primary Examiner*—Mark O. Budd
*Attorney, Agent, or Firm*—Robert S. Smith

[57] ABSTRACT

An electrodynamic device translates an objective 1 along a path 4 in a radial direction relative to the axis of rotation 2 of an optical disc 3 and comprises a slide 6 on which the objective is arranged and a parallel-guide arrangement along which the slide is movable. It also comprises two stator magnets 7A and 7B, arranged on a stator yoke of a magnetizable material, and two drive coils 8A and 8B which are connected to the slide 6 and which can be translated in the magnetic field of the stator magnets. The slide 6 is movable on two guide rods 8A and 9B of a magnetizable material, which rods provide the parallel guidance of the slide 6 and also serve as parts of the stator yoke, air gaps 12A and 12B being formed between the permanent magnets and the drive coils being arranged around the guide rods.

7 Claims, 5 Drawing Figures

ELECTRODYNAMIC DEVICE FOR TRANSLATING AN OBJECTIVE

The invention relates to an electrodynamic device for translating an objective along a radial path relative to a disc which rotates about an axis of rotation. The device comprises: a frame; a slide which is translatable to the frame along said radial path and which carries the objective; a parallel-guide arrangement for the slide, which arrangement comprises bearing means for guiding the slide relative to the frame parallel to said path; at least one permanent-magnetic stator magnet which is secured to the frame, which extends parallel to said path, and which is magnetized transversely of said path; a stator yoke of a magnetizable material, which yoke carries the stator magnet; and at least one drive coil of an electric conductive material, which coil is connected to the slide and is translatable in the magnetic field of the stator magnet.

Such an electrodynamic device is known from, for example, European Patent Application No. 0,066,317 which has been laid open to public inspection, in particular FIG. 8 and the corresponding part of the description. In this known device the slide comprises a translating member of substantially triangular cross-section. For the parallel guidance of the member, ball bearings are arranged on the frame. At one end the member carries the objective lens at the other end a coil which travels in the field of a plurality of stator magnets. Said device is intended for use in an optical data-storage apparatus using optical discs with a diameter of approximately 30 cm, which discs rotate with a comparatively high speed. The device is very robust but also comparatively heavy and intricate and it requires a comparatively high driving power for translating the member carrying the objective.

It is the object of the invention to provide an electrodynamic device of the type mentioned in the opening paragraph, which is suitable for use in conjunction with smaller optical-disc apparatus, which is of a lighter and simpler construction and requires less driving power. The invention is characterized in that the parallel-guide arrangement comprises at least one guide rod of a magnetizable material, which rod is secured to the frame and carries the slide; in that the guide rod forms part of the stator yoke and an air gap is formed between the guide rod and the stator magnet; and in that the drive coil is arranged around the guide rod. The construction of the electrodynamic device is simplified substantially by not only using the guide rod for the parallel guidance but also for short-circuiting the permanent-magnetic circuit of the stator. The drive coil is disposed partly within the air gap between the permanent magnet and the guide rod and since the guide rod short-circuits the permanent-magnetic circuit only that part of the coil which is situated in the air gap or in the immediate proximity of this gap is disposed in the field of the permanent magnet. After having passed said part of the coil, the flux of the permanent-magnetic field returns in an axial direction to the magnet via the guide rod. This precludes that the parts of the turns lying on the other side of the coil are also disposed in the magnet field. These parts of the turns would otherwise exert undesired counter-acting forces on the slide.

An embodiment of the invention is characterized in that: the drive coil is arranged on a cylindrical coil former; the coil former is arranged around the guide rod; and the parallel-guide arrangement comprises at least one bearing which is arranged in the coil former and which cooperates with the guide rod. This embodiment effectively utilizes the coil former for mounting one or more bearings which cooperate with the guide rod. Another embodiment which is advantageous in this respect is characterized in that the coil former forms a structural part of the slide. In this embodiment the coil former also serves as a connecting element between other parts of the slide.

Another embodiment of the invention, which does not comprise a coil former, is characterized in that: the turns of the coil are interconnected by connecting means to form a structural unit and the coil forms a structural part of the slide. In this embodiment the coil is initially wound onto an auxiliary tool of the required dimensions and subsequently it is formed to a structural unit by a connecting means, for example, an impregnating lacquer. In a later stage this unit is employed as a connecting element between other parts of the slide.

In general it is required to arrange the objective on the slide so as to be movable along its optical axis to allow the axial movements of an optical disc to be followed constantly by a radiation beam which is formed to a read spot by the objective. For this purpose the objective in the aforementioned known device is connected to an actuator coil in order to obtain an electrodynamic driving movement along the optical axis. An embodiment of the invention which is further simplified is characterized in that: a part of the actuator is movable in said air gap between the guide rod and the stator magnet and cooperates with the field of the stator magnet to subject the objective to forces which act along its optical axis. In this embodiment the magnetic field in the air gap between the stator magnet and the guide rod, which field is used for driving the slide is also utilized for the focusing movements of the objective, thereby further simplifying the device.

An embodiment of the invention which simplifies the construction of the stator yoke is characterized in that the frame is made of a magnetizable material and forms part of the stator yoke. The frame may, for example, be of soft-iron and can be manufactured from a sheet material by simple means. The stator magnet may be secured to the stator yoke in a rapid and easy manner by means of a suitable glue.

In order to obtain a satisfactory guidance of the slide while maintaining the advantages of the aforementioned embodiments, a further embodiment of the invention may be used, which is characterized in that: the device has a symmetrical construction with two identical guide rods, drive coils, actuator coils and stator magnets; the guide rods are ground rods of circular cross-section; the frame is shaped substantially as an open box with a bottom and upright walls; the stator magnets are secured to the inner side of a first set of facing frame walls; and the guide rods are placed on portions of the second set of facing frame walls. As a result of the symmetrical construction with two guide rods eccentrically acting driving forces and inertial forces cannot exert undesired torques on the slide. The guide rods have a circular cross-section. As is known, ground rods of circular cross-section are the simplest and cheapest precision parts. Supporting points for the round guide rods can be formed on the stator yoke with the required precision by subjecting this yoke to a comparatively simple mechanical operation.

BRIEF DESCRIPTION OF THE DRAWINGS

An embodiment of the invention will now be described in more detail, by way of example, with reference to the drawings, in which.

Figure 1:
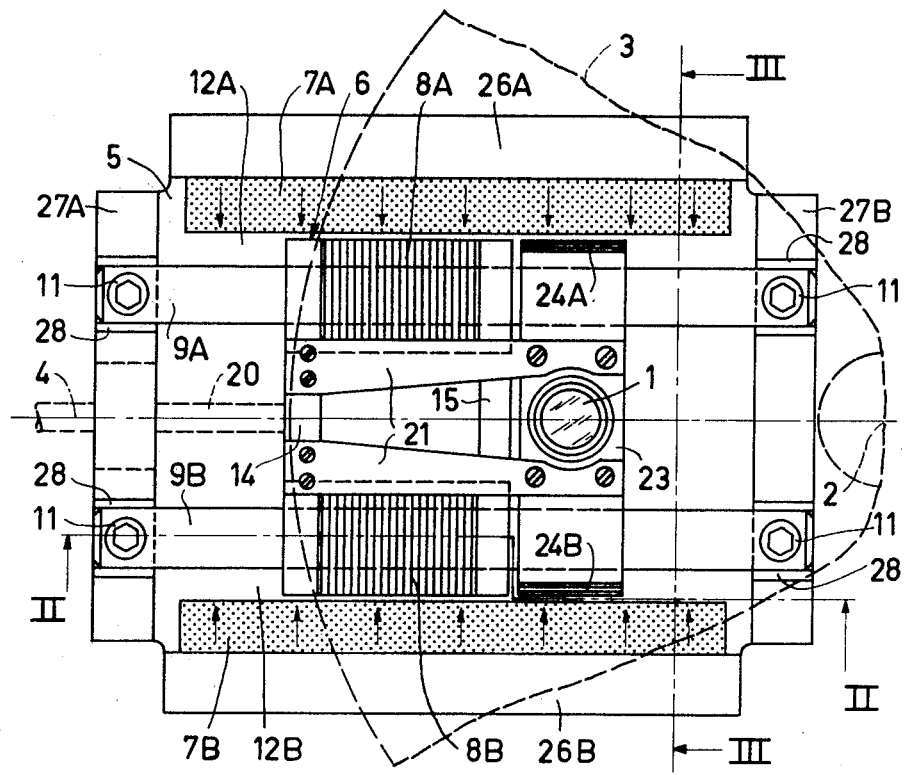
FIG. 1 is a schematic plan view of a symmetrically constructed electrodynamic device in accordance with the invention.

The electrodynamic device shown serves for translating an objective 1 along a radial path 4 relative to a disc 3 (see FIG. 2) which rotates about an axis of rotation 2. The device comprises a frame 5 and a slide 6 which carries the objective 1, and which can be translated relative to the frame along the radial path 4. The frame carries two permanent stator magnets 7A and 7B, which extend parallel to the path 4 and which are magnetized transversely of said path, the directions of magnetization being indicated by arrows in FIG. 1 and in FIG. 3. Two translatable drive coils 8A and 8B of an electrically conductive material are movable in the magnetic field of the stator magnets.

The parallel-guide arrangement for the slide 6 comprises two guide rods 9A and 9B and sleeve bearings 10 made of tetrafluoroethylene. The guide rods are secured to the frame 5 by means of bolts 11. They form part of a stator yoke with an air gap, 12A and 12B respectively, between the stator magnet 7A and the guide rod 9A and between the stator magnet 7B and the guide rod 9B, respectively. The drive coils 8A and 8B are arranged around the respective guide rods 9A and 9B.

Figure 2:
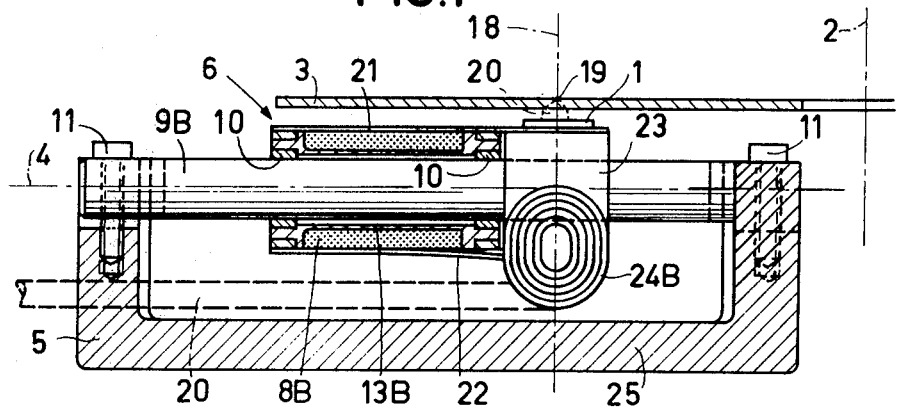
FIG. 2 is a longitudinal section taken on the lines II—II in FIG. 1.
Figure 3:
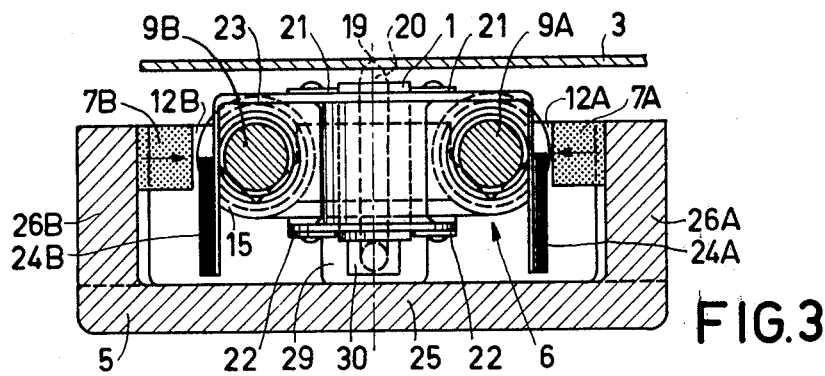
FIG. 3 is a cross-section taken on the lines III—III in FIG. 1.
Figure 4:
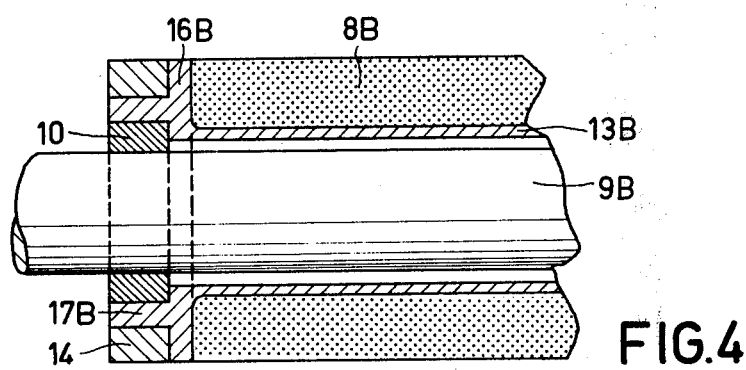
FIG. 4 shows a part of FIG. 2 on an enlarged scale.
Figure 5:
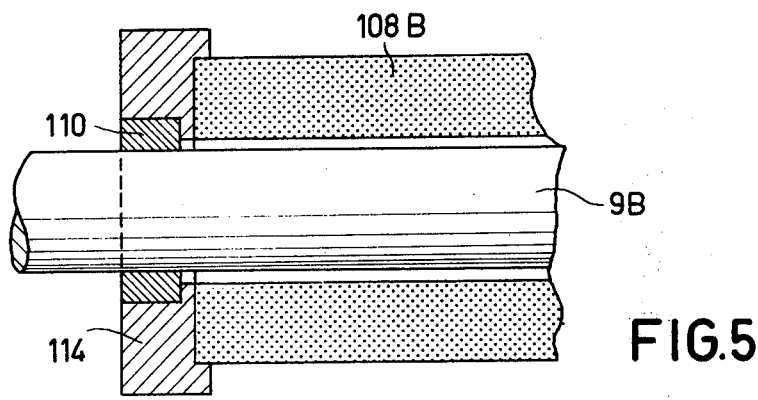
FIG. 5 shows the same part as FIG. 4, but now for a different embodiment of the invention.

As is shown on an enlarged scale in FIG. 4, each drive coil 8A, B in the embodiment shown in FIGS. 1 to 3 is supported by a cylindrical coil former 13A, B. The coil formers are arranged around the guide rods 9A and 9B and internally they are each provided with said sleeve bearings 10 on both ends. The coil formers form a structural part of the slide. In addition to the coil formers the slide comprises two end plates 14 and 15. The only function of these end plates is to interconnect two coils 8A and 8B and they are preferably made of a non-magnetizable light-weight but strong material such as a plastic or aluminium. FIG. 4 shows that the coil former 13B comprises a flange 16B and a cylindrical collar 17B at its left end. At the right end the coil former also comprises a flange and a collar. The coil former 13A is also provided with identical flanges and collars. The collars engage cylindrical apertures in the end plates 14 and 15 and are secured in these apertures, for example by glueing. In this way the coil formers and the end plates together constitute a robust slide. Another possibility, where the coil is not wound on a coil former, is shown in FIG. 5. The turns of the coil 108B are interconnected to form a structural unit by a connecting means such as an impregnating lacquer. Locally the end plate 114 is formed with a recess whose diameter is adapted to the outer diameter of the coil 108B, in which recess the coil is glued. In this way a slide can be formed by means of two coils and two end plates. The bearings 110 are arranged directly in a recess in the end plates.

This embodiment in which the coils form a structural part of the slide has the advantage that no separate coil formers are required, while the dimension of the carriage measured in the direction of the path 4 may also be slightly smaller. However, the coils must now be wound on a jig and the turns must be interconnected.

The objective 1 is movable along its optical axis 18 so as to enable the movements of the disc 3 to be followed by means of the read spot 19 formed by a radiation beam 20 emitted by a suitable radiation source. The objective is mounted on the slide 6 by means of two plate springs 21 on the upper side and two plate springs 22 on the lower side. The objective is arranged on a bracket 22 which is movable to a limited extent along the optical axis 18 and which carries actuator coils 24A and 24B on the respective ends. These coils serve for the electrodynamic drive of the objective along the optical axis. The upper parts of the actuator coils are movable in the air gaps 12A and 12B respectively between the guide rods 9A and 9B and the stator magnets 7A and 7B, so that the actuator coils cooperate with the field of the stator magnets to exert forces on the objective along its optical axis. Thus, the stator magnets are used both for driving the slide along the axis 4 and for driving the objective along the axis 18.

The frame 5 is made of a magnetizable material, for example iron, and forms part of a stator yoke which carries the permanent magnets 7A and 7B and of which the guide rods 9A and 9B also form part, as already stated.

The device is constructed symmetrically relative to a plane containing the axes 4 and 18. The guide rods 9A and 9B are identical and the same applies to the drive coils 8A and 8B, the actuator coils 24A and 24B, and the stator magnets 7A and 7B. The guide rods are ground rods of circular cross-section, which as is known are the cheapest precision parts available.

The frame 5 is shaped substantially as an open box having a bottom 25 and upright walls 26A, 26B and 27A, 27B. At the corners the walls are not interconnected. The complete frame is blanked from a sheet material, the walls being formed by portions which are bent-over relative to the deck plate. The stator magnets 7A and 7B are secured to the inner side of the walls 26A and 26B, for example by means of a suitable glue. The magnetic lines of force of the magnets extend from the magnets 8A and 8B through the air gaps 12A and 12B to the guide rods 9A and 9B, whose ends are placed on portions of the walls 27A and 27B. Thus, they are in contact with the magnetizable frame 5, so that the magnetic circuit is closed through the frame.

In order to guarantee that the guide rods 9A and 9B extend perfectly parallel to each other and are disposed at the same level recesses 28 with a V-shaped bottom are formed in the walls 27A and 27B. These recesses can simply be formed with the required accuracy by a machining operation. No stringent requirements are imposed on the accuracy of the other parts of the frame 5. The accuracy of the guide arrangement for the slide 6 is mainly determined by the degree of accuracy of the guide rods 9A and 9B and the accuracy with which they extend parallel to each other and are supported at the same level by the frame.

In the wall 27A an aperture 29 is formed which inter alia serves for the passage of the radiation beam 20. On its underside the objective 1 carries a reflecting element 30 which reflects the radiation beam through an angle of 90°. The aperture 29 also serves for the passage of the electrical connecting wires to the coils 8A and 8B on the slide and the actuator coils 24A and 24B. Such connecting wires and other electrical connections are not shown for the sake of simplicity and are irrelevant to the present invention. The means which are generally required for detecting the position of the objective 1 in the path 4 are not shown and are also irrelevant to the present invention.

What is claimed is:

1. An electrodynamic device for translating an objective along a radial path to a disc which rotates about an axis of rotation, which device comprises:
   a frame,
   a slide which is translatable relative to the frame along said radial path (4) and which carries the objective,
   a parallel-guide arrangement for the slide, which arrangement comprises bearing means for guiding the sliding relative to the frame parallel to said path,
   at least one permanent-magnetic stator magnet which is secured to the frame, which extends parallel to said path and which is magnetized transversely of said path,
   a stator yoke of a magnetizable material, which yoke carries the stator magnet, and
   at least one drive coil of an electrically conductive material, which coil is connected to the slide and is translatable in the magnetic field of the stator magnet,
   characterized in that:
   the parallel-guide arrangement comprises at least one guide rod of a magnetizable material, which rods secured to the frame and carries the slide,
   the guide rod forms part of the stator yoke and an air gap is formed between the guide rod and the stator magnet, and
   the drive coil is arranged around the guide rod.

2. An electrodynamic device as claimed in claim 1, characterized in that:
   the drive coil is arranged on a cylindrical coil former,
   the coil former is arranged around the guide rod, and
   the parallel-guide arrangement comprises at least one bearing which is arranged in the coil former and which cooperates with the guide rod.

3. An electrodynamic device as claimed in claim 2, characterized in that the coil former forms a structural part of the slide.

4. An electrodynamic device as claimed in claim 1, characterized in that:
   the turns of the coil are interconnected by connection means to form a structural unit, and
   the coil (108A, 108B) forms a structural part of the slide.

5. An electrodynamic device as claimed in claim 1, the objective being arranged on the slide (6) so as to be movable along its optical axis and being connected to at least one actuator coil in order to obtain the electrodynamic driving movement along the optical axis characterized in that a part of the actuator coil is movable in said air gap between the guide rod and the stator magnet and cooperates with the field of the stator magnet to subject the objective to forces which act along its optical axis.

6. An electrodynamic device as claimed in claim 1, characterized in that the frame is made of a magnetizable material and forms part of the stator yoke.

7. An electrodynamic device as claimed in claim 5, characterized in that:
   the device has a symmetrical construction with two identical guide rods, drive coils, actuator coils and stator magnets,
   the guide rods are ground rods of circular cross-section,
   the frame is shaped substantially as an open box with a bottom and upright walls
   the stator magnets are secured to the inner side of a first set of facing walls of the frame, and
   the guide rods (9A, 9B) are placed on portions of the second set of facing walls of the frame.

* * * * *